US009084195B2

(12) United States Patent
Sebire et al.

(10) Patent No.: US 9,084,195 B2
(45) Date of Patent: Jul. 14, 2015

(54) MULTIPLE TIMING ADVANCE AND CARRIER AGGREGATION

(75) Inventors: Benoist P. Sebire, Tokyo (JP); David Randall, Hampshire (GB)

(73) Assignee: Nokia Technologies Oy, Espoo (FI)

( * ) Notice: Subject to any disclaimer, the term of this patent is extended or adjusted under 35 U.S.C. 154(b) by 794 days.

(21) Appl. No.: 12/752,482

(22) Filed: Apr. 1, 2010

(65) Prior Publication Data

US 2011/0243102 A1    Oct. 6, 2011

(51) Int. Cl.
*H04W 56/00* (2009.01)
*H04L 5/00* (2006.01)
*H04L 5/14* (2006.01)

(52) U.S. Cl.
CPC ........... *H04W 56/0045* (2013.01); *H04L 5/001* (2013.01); *H04L 5/0053* (2013.01); *H04L 5/1469* (2013.01)

(58) Field of Classification Search
None
See application file for complete search history.

(56) References Cited

U.S. PATENT DOCUMENTS

| | | | |
|---|---|---|---|
| 8,040,870 B1 * | 10/2011 | Smidth et al. ................. | 370/350 |
| 2009/0300457 A1 * | 12/2009 | Kuo .............................. | 714/749 |
| 2010/0020786 A1 | 1/2010 | Futaki et al. | |
| 2010/0061361 A1 * | 3/2010 | Wu .............................. | 370/350 |
| 2010/0279695 A1 * | 11/2010 | Amirijoo et al. ............. | 455/438 |
| 2011/0021154 A1 * | 1/2011 | Marinier et al. ........... | 455/67.11 |
| 2011/0026625 A1 * | 2/2011 | Susitaival et al. ............ | 375/260 |
| 2011/0170535 A1 * | 7/2011 | Wang et al. .................. | 370/350 |

FOREIGN PATENT DOCUMENTS

| | | |
|---|---|---|
| CN | 1505882 A | 6/2004 |
| WO | WO-03/065636 A1 | 8/2003 |

OTHER PUBLICATIONS

"Stage 2 description of Carrier Aggregation", 3GPP TSG-RAN WG2 Meeting #69, R2-101846, Feb. 2010, 16 pgs.
"$3^{rd}$ Generation Partnership Project; Technical Specification Group Radio Access Network; Evolved Universal Terrestrial Radio Access (E-UTRA) Radio Resource Control (RRC); Protocol specification (Release 9)", 3GPP TS 36.331 V9.1.0 , Dec. 2009, 233 pgs.

(Continued)

*Primary Examiner* — Ian N Moore
*Assistant Examiner* — Brian T Le
(74) *Attorney, Agent, or Firm* — Harrington & Smith

(57) ABSTRACT

At least one of transmissions and receptions over allocated radio resources within a first timing advance group are synchronized using a first timer; and similar for allocated radio resources within a second timing advance group that are synchronized using a second timer. In response to determining that the first timer remains synchronized while the second timer is not synchronized with a radio network which has allocated the respective radio resources, a first procedure is followed for the case in which there is a primary component carrier within the second timing advance group and a different second procedure for the case in which there is no primary component carrier within the second timing advance group. In an exemplary embodiment, a message is sent to the radio network indicating that the second timer has expired. Various distinctions between the two procedures, and how the message is sent, are detailed for different embodiments.

26 Claims, 4 Drawing Sheets

(56) References Cited

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 9)", 3GPP TS 36.321 V9.1.0, Dec. 2009, 48 pgs.

3GPP TSG-RAN WG2 Meeting #68bis, San Francisco, USA, Feb. 22-26, 2010, Agenda 7.1.9, Nokia Corporation, Nokia Siemens Networks, "RACH and Carrier Aggregation", R2-101285, (3 pages).

3GPP TSG-RAN WG2 Meeting #68bis, Valencia, Spain, Jan. 18-22, 2010, Agenda 7.1.1, Qualcomm Incorporated, "Supporting Multiple Timing Advance Group", R2-100423, (3 pages).

3GPP TSG-RAN WG2 Meeting #68bis, San Francisco, USA, Feb. 22-26, 2010, Agenda 7.1.4, Nokia Corporation, Nokia Siemens Networks, "Radio Link Failure Open Issues", R2-101283, (4 pages).

3GPP TSG-RAN WG2 Meeting #68bis, Valencia, Spain, Jan. 18-22, 2010, Agenda 7.1.1, ITRI, "Time Alignment Timer for Different TA", R2-100560, (2 pages).

\* cited by examiner

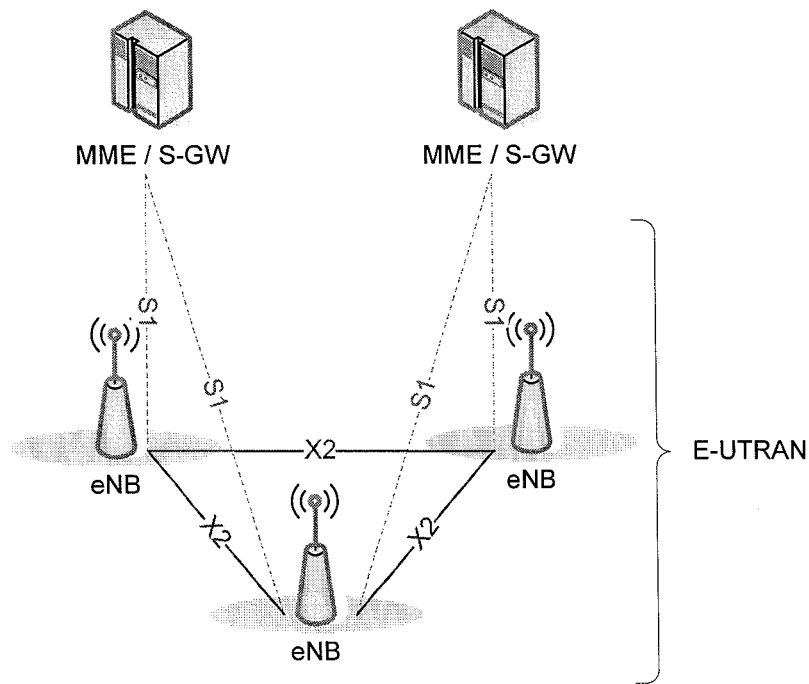
Figure 1: Prior Art
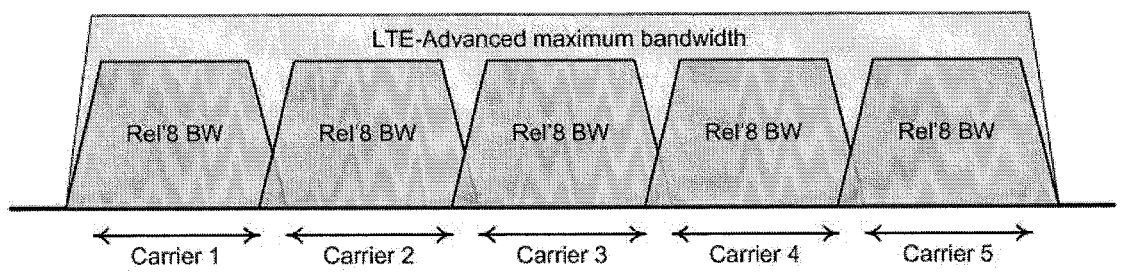
Figure 2: Prior Art

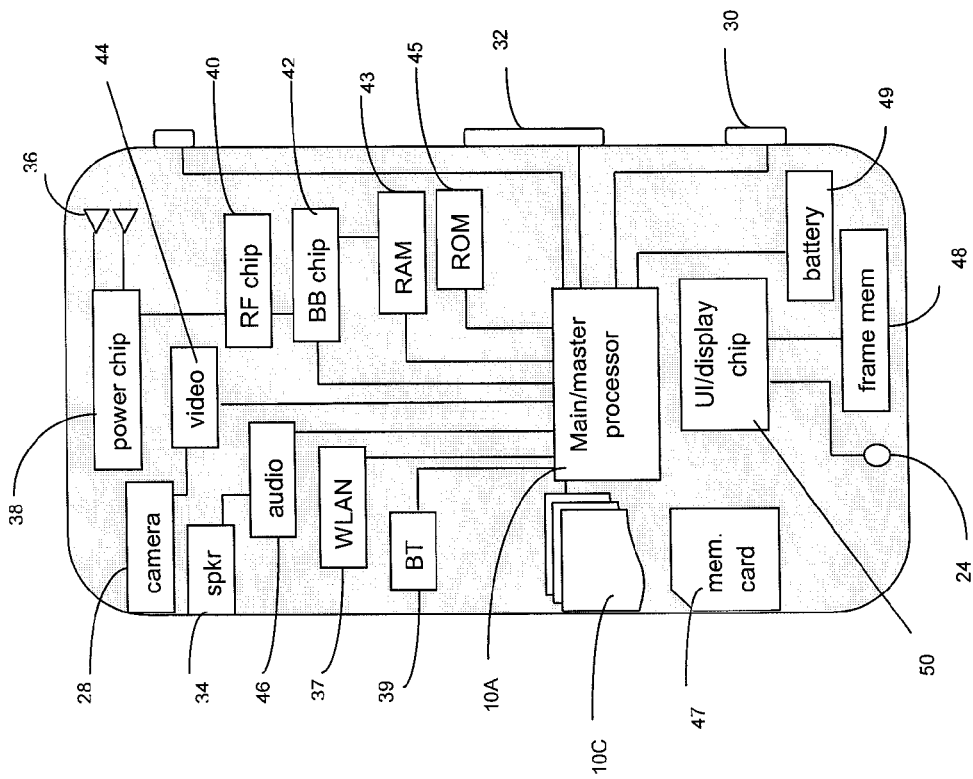
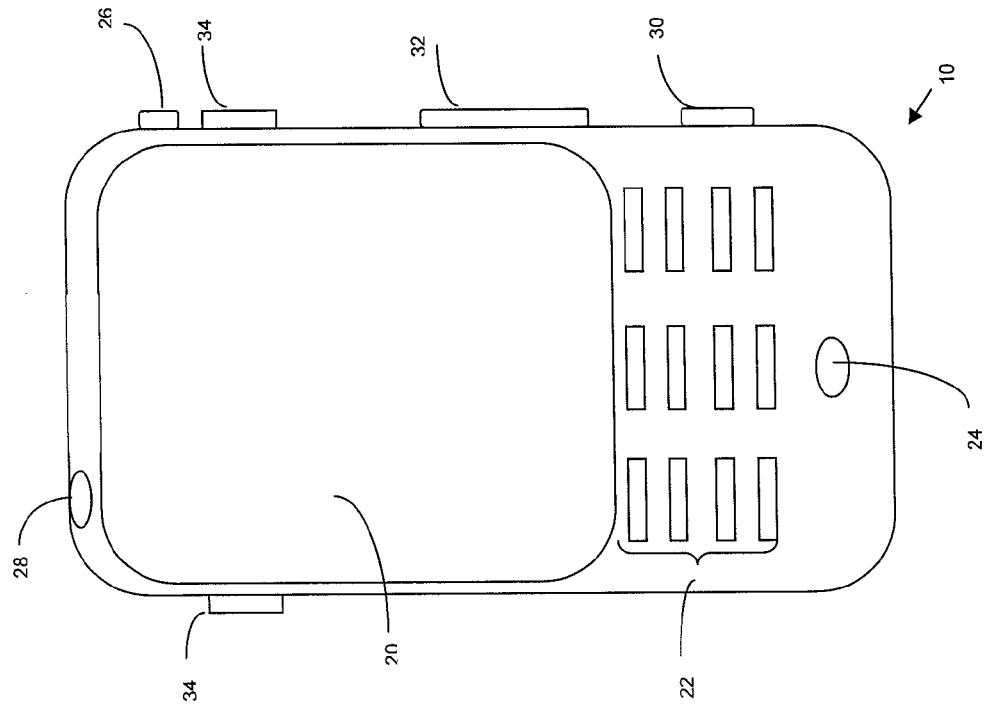
Figure 4

MULTIPLE TIMING ADVANCE AND CARRIER AGGREGATION

TECHNICAL FIELD

The exemplary and non-limiting embodiments of this invention relate generally to wireless communication systems, methods, devices and computer programs and, more specifically, relate to synchronization/timing alignment timers in a communication system which employs carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
- 3GPP third generation partnership project
- ARQ automatic repeat request
- BSR buffer status report
- CA carrier aggregation
- CC component carrier
- CE control element
- DL downlink (eNB to UE)
- eNB EUTRAN Node B (evolved Node B/base station)
- E-UTRAN evolved UTRAN (LTE)
- HARQ hybrid ARQ
- LTE long term evolution
- MAC medium access control
- NACK negative acknowledgment
- PCC primary component carrier
- PDCCH physical downlink control channel
- PUCCH physical uplink control channel
- RACH random access channel
- RRC radio resource control
- SCC secondary component carrier
- SR scheduling request
- SRS sounding reference signal
- UE user equipment
- UL uplink (UE to eNB)
- UTRAN universal terrestrial radio access network In the communication system known as evolved UTRAN (E-UTRAN, also referred to as UTRAN-LTE or E-UTRA), the LTE Release 8 is completed, the LTE Release 9 is being standardized, and the LTE Release 10 is currently under development within the 3GPP. In LTE the downlink access technique is orthogonal frequency multiple division access OFDMA, and the uplink access technique is single carrier, frequency division multiple access SC-FDMA. These access techniques are expected to continue in LTE Release 10.

FIG. 1 reproduces FIG. 4.1 of 3GPP TS 36.300, V8.6.0 (2008-09), and shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an evolved packet core, more specifically to a MME and to a Serving Gateway. The S1 interface supports a many to many relationship between MMEs/Serving Gateways and the eNBs.

Of particular interest herein are the further releases of 3GPP LTE targeted towards future international mobile telecommunications (IMT)-advanced systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10 which is to be backward compatible with LTE Release 8 and to include bandwidth extensions beyond 20 MHz, among others. For an overview see for example 3GPP TR 36.913 v9.0.0 (2009-12) Requirements for further advancements for Evolved Universal Terrestrial Radio Access (E-UTRA) (LTE_Advanced) (Release 9).

The bandwidth extension in LTE Release 10 is to be done via carrier aggregation (CA), in which several Release 8 compatible carriers are aggregated together to form a system bandwidth. This is shown by example at FIG. 2 in which there are five Release 8 compatible CCs aggregated to form one larger LTE Release 10 bandwidth. Existing Release 8 terminals can receive and/or transmit on one of the CCs for backward compatibility, while future LTE-A terminals could potentially receive/transmit on multiple CCs at the same time to give the eNB greater scheduling flexibility while increasing data throughput.

In cellular radio systems generally, the user equipments adjust the timing of their transmissions to the base station so that the times when each transmitted symbol arrives at the eNB's receiver are within at most a small timing offset of the times when the eNB is expecting them. This example is uplink time alignment.

Specifically for the LTE Release 8/9 system, the UE synchronizes its uplink transmissions by first synchronizing with the eNB's transmissions in the downlink (by detecting bit and frame timing), and then transmitting at a fixed delay (stipulated by a the controlling radio standard) relative to the downlink, the delay further reduced by a timing advance. The timing advance compensates for the round trip propagation delay between the eNB and the UE and varies with time, due to the UEs mobility.

The UE operating in an LTE Release 8/9 system obtains the correct timing during its initial entry into the network, which is done via a RACH procedure that does not require pre-existing timing synchronization between the accessing UE and the network. Once established in the network the UE's timing is kept in alignment by a MAC CE, which the eNB transmits to a specific UE when it detects that the UE's uplink transmission timing is in error.

The UE tracks its timing alignment by means of a time alignment timer, which is started or restarted whenever a timing correction is received (either in a MAC CE or a Random Access Response). If the timing alignment expires, the UE is required to act as if timing alignment has been lost. For the LTE Release 8 cellular radio system, a UE whose timing alignment timer has expired is required [by 3GPP TS36.321 section 5.2] to:
- flush all HARQ buffers;
- notify RRC to release PUCCH/SRS; and
- clear any configured downlink assignments and uplink grants.

In LTE Release 8 the UE does not initiate RACH transmissions to keep in uplink time alignment, these must be triggered by the eNB. The eNB can keep a non-transmitting UE in uplink time alignment by instructing it, via a PDCCH order that is transmitted on the PDCCH to transmit on the RACH.

Flushing the HARQ buffers deletes all information pending transmission/re-transmission from the HARQ level. Releasing the PUCCH/SRS removes the uplink control channel that the UE uses to transmit ACK/NACK reports, CQI measurement reports and SR bits that are used to indicate that the UE has uplink data to send. Clearing the configured downlink assignments and uplink grants removes all current or pending opportunities/requirements for uplink transmission.

Once a UE loses its uplink time alignment in an LTE Release 8 system it is not permitted to transmit in the uplink, except on the RACH. In the current 3GPP LTE specification, expiry of the time alignment timer itself does not trigger the UE to initiate a RACH transmission.

The UE with lost timing synchronization continues to receive the PDCCH control channel in LTE Release 8, but does not transmit in the uplink, unless one of the following occurs:

It receives on its downlink control channel a PDCCH order command that triggers it to transmit on RACH and receive a time alignment correction in response. This will bring the UE into uplink time alignment and enable it to transmit in the uplink. The Time Alignment Timer is restarted.

It has new uplink data to transmit which triggers the sending of buffer status report (BSR). This will, in turn, trigger the UE to transmit on RACH in order receive a grant to send the BSR. The Random Access Response will also provide the timing correction that will bring the UE into uplink time alignment.

But in LTE Release 8/9 there is no CA, and so each UE tracks its timing synchronization with the eNB by a single timing alignment timer. In the CA arrangement of spectrum as in LTE Release 10, a single UE may be assigned radio resources on more than one CC. In some cases more than one CC is aligned in time and so the same timing alignment timer can be used for them all. Such timing-dependent CCs for which the UE tracks timing synchronization by a single timing alignment timer are termed a timing advance group of CCs, and there may be only one or more than one CC in any timing advance group. In other cases at least two of the CCs assigned to the LTE Release 10 UE are timing independent, and so the UE must maintain a separate timing advance timer for each of the different timing advance groups it is assigned. Currently it is not specified how a UE should respond in the case where one but not all timing alignment timer expires for a UE that is operating with two or more timing advance groups.

To extend the LTE Release 8/9 rules for the case of lost timing synchronization on less than all configured timing advance groups would be to dis-allow the UE from transmitting in the uplink on any of its configured CCs. This result would waste the capacity of the uplink carriers for which the UE still has timing alignment. Alternatively, the eNB can keep the UE in timing alignment for all its configured carriers by way of a MAC CE and/or PDCCH order procedures. However, errors in acknowledgement (NACK to ACK errors in which a UE's NACK sent with improper timing is interpreted by the eNB as an ACK) at the HARQ level for such MAC CE corrections can mean that the eNB thinks that the UE is time aligned whereas one or more of that same UE's time alignment timers have expired. In principle, the eNB could also allow timing alignment to temporarily lapse for one or more of the UE's configured timing groups, but not the timing group which includes the UE's primary CC. But in this case the UE will not know whether or not the expired timing alignment timer was intended by the network.

SUMMARY

In accordance with a first aspect the exemplary embodiments of the invention include a method comprising: an apparatus synchronizing at least one of transmissions and receptions over allocated radio resources within a first timing advance group using a first timer; the apparatus synchronizing at least one of transmissions and receptions over allocated radio resources within a second timing advance group using a second timer; and in response to determining that the first timer remains synchronized while the second timer is not synchronized with a radio network which has allocated the respective radio resources, the apparatus following a first procedure for the case in which there is a primary component carrier within the second timing advance group and following a different second procedure for the case in which there is no primary component carrier within the second timing advance group.

In accordance with a second aspect the exemplary embodiments of the invention include a memory storing a program of computer readable instructions that when executed by a processor result in actions comprising: synchronizing at least one of transmissions and receptions over allocated radio resources within a first timing advance group using a first timer; synchronizing at least one of transmissions and receptions over allocated radio resources within a second timing advance group using a second timer; and in response to determining that the first timer remains synchronized while the second timer is not synchronized with a radio network which has allocated the respective radio resources, following a first procedure for the case in which there is a primary component carrier within the second timing advance group and following a different second procedure for the case in which there is no primary component carrier within the second timing advance group.

In accordance with a third aspect the exemplary embodiments of the invention include an apparatus comprising at least one processor and at least one memory including computer program code. In this third aspect the at least one memory and the computer program code are configured, with the at least one processor, to cause the apparatus to at least: synchronize at least one of transmissions and receptions over allocated radio resources within a first timing advance group using a first timer; synchronize at least one of transmissions and receptions over allocated radio resources within a second timing advance group using a second timer; and in response to determining that the first timer remains synchronized while the second timer is not synchronized with a radio network which has allocated the respective radio resources, follow a first procedure for the case in which there is a primary component carrier within the second timing advance group and follow a different second procedure for the case in which there is no primary component carrier within the second timing advance group.

These and other aspects are set forth in further detail below.

BRIEF DESCRIPTION OF THE DRAWINGS

FIG. 1 reproduces FIG. 4 of 3GPP TS 36.300 (v8.6.0), and shows the overall architecture of the E-UTRAN system.

FIG. 2 is a schematic diagram of a radio spectrum in which cross-scheduling can be employed, in which five component carrier bandwidths are aggregated into a single LTE Release 10 bandwidth.

FIG. 4 shows a more particularized block diagram of a user equipment such as that shown at FIG. 4.

DETAILED DESCRIPTION

The examples below are in the context of a LTE Release 10 system but may be employed with any CA type wireless communication system. FIG. 2 is specific to LTE Release 10 but still shows the general concept of CA; smaller frequency chunks such as for example 1.4 MHz, 5 MHz and 10 MHz CCs can be aggregated, and the total CA bandwidth can be less than or greater than 100 MHz. Some CA systems or embodiments may have non-contiguous CCs (for example the spectrum blocks forming the CCs might be far apart in terms of frequency such as 700 MHz and 2.1 GHz). Other CA systems or embodiments may have an asymmetric DL/UL CA which for example may be built into a CA system by combining a frequency division duplex FDD component carrier with a time division duplex TDD component carrier. LTE Release 10 is not the only CA-type system but is used in the examples here to explain the invention using specific examples, and so the concepts detailed below are not limited only to the LTE Release 10 system.

Figure 3:
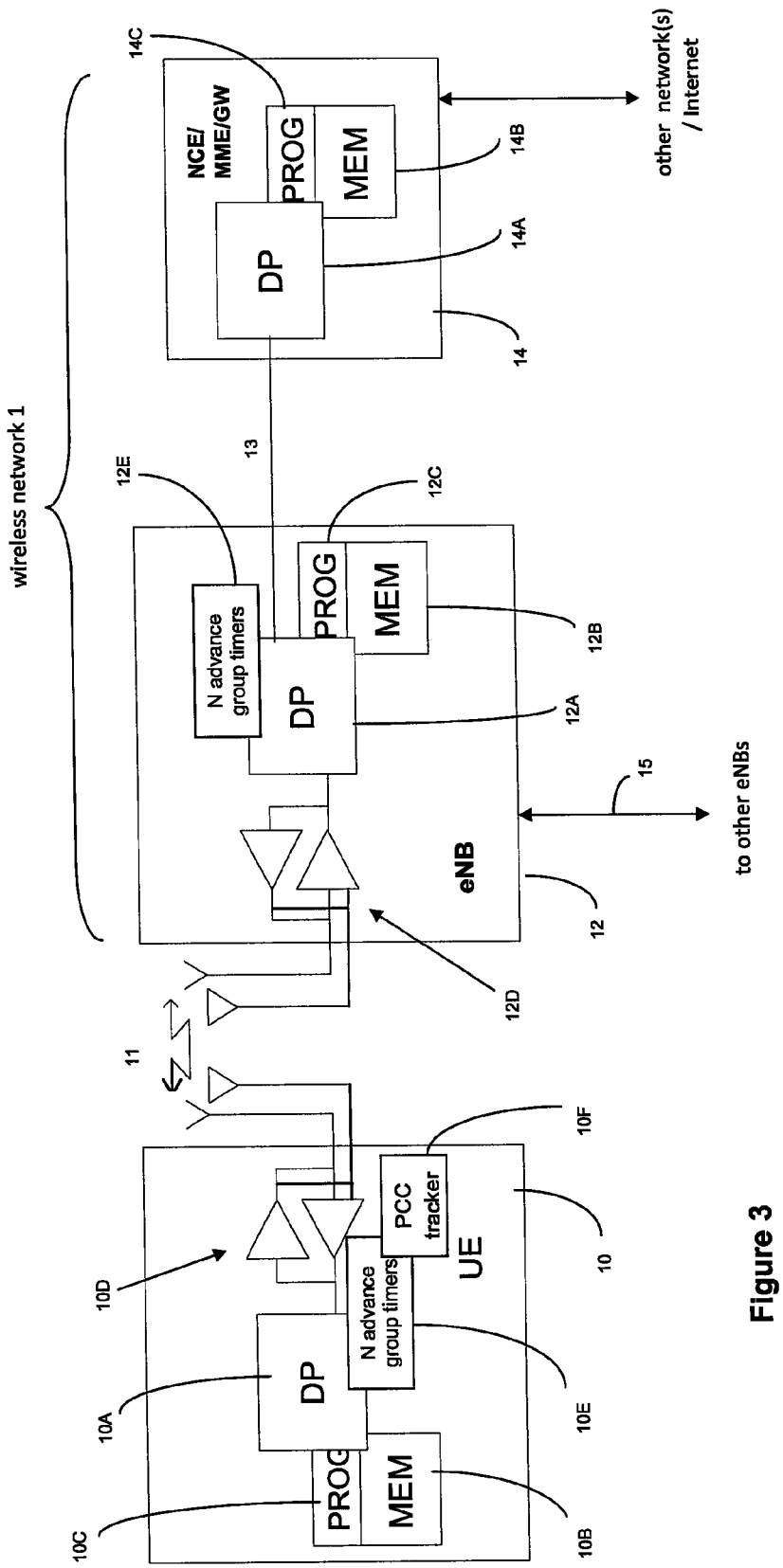
FIG. 3 shows a simplified block diagram of certain apparatus according to various exemplary embodiments of the invention.

Refer to FIG. 3 for a simplified block diagram of various electronic devices and apparatus that are suitable for use in practicing the exemplary embodiments of this invention. In FIG. 3 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the mobility entity/serving gateway MME/S-GW functionality shown in FIG. 1A, and which provides connectivity with a network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a plurality of timing advance group timers 10E, and the eNB 12 may include a plurality of timing advance group timers 12E. Shown at FIG. 3 are N such timers in each of the UE 10 and the eNB 12, in which N is an integer equal to the number of CCs in the CA system (and the N timers shown for the eNB are reserved per UE). A number of these timers may run independently, according to the number of timing independent groups of CCs that are assigned to the UE in a given cell. By example the timers may be oscillators (voltage controlled or numerically controlled) within any one of the various processors shown at FIGS. 3-4, or they may be stand-alone timers/oscillators/counters such as are shown at FIG. 3 as timers 10E and 12E. Also at FIG. 3 is a PCC tracker 10F which tracks for the UE 10 in which timing advance group its primary component carrier PCC lies. When one of the N timers expires, this tracker 10F compares whether the group having the expired timer does or does not carry the UE's assigned PCC. Different procedures are followed if the timing advance group associated with the expired timer includes or not the PCC, as is detailed further below by example. In an exemplary embodiment the function of the PCC tracker 10F is incorporated into the main processor 10A or any of the other processors/chips shown at FIG. 4.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 4 illustrates further detail of an exemplary UE in both plan view (left) and sectional view (right), and the invention may be embodied in one or some combination of those more function-specific components. At FIG. 4 the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 4 are seen multiple transmit/receive antennas 36 that are typically used for cellular communication. The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention need not be disposed in any individual processor/chip but may be disposed across various chips and memories as shown or disposed within another processor that combines some of the functions described above for FIG. 4. Any or all of these various processors of FIG. 4 access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 4.

Note that the various chips (e.g., 38, 40, 42, etc.) that were described above may be combined into a fewer number than described and, in a most compact case, may all be embodied physically within a single chip.

The background section above details that it is not yet known how to handle the case in which a UE, having more than one timing advance groups of CCs (each group having one or more CCs), finds that it has lost synchronization with the access node/eNB for one of the groups but not for all of them. In LTE Release 10 this timing synchronization is kept by a group-specific timing advance timer and synchronization is lost for a timing advance group when the timing advance timer for that group expires.

The exemplary embodiments detailed below concern the case in which the UE is assigned more than one timing advance group, in which each timing advance group uses a timing correction that is different from other group's corrections. Specific but non-limiting examples of this include a CC for UL and another CC for DL in one group and one CC for both UL and DL in another group, or only a single CC for UL and DL in each of a first and second timing advance group, or two or more CCs for UL and DL in one group and one or more CCs for UL and DL in another group and one or more CCs for UL and DL in a third group. The examples below describe the exemplary embodiments in the context of two timing advance groups which are timing-independent and so are tracked by the UE 10 and eNB 12 each using two timers, but the UE may have a third or more groups that are timing independent of the first and second timing advance groups. Any timing advance group can have one or more CCs. All CCs in a timing advance group use the same timer for synchronization between the UE and the eNB.

By example, the need for different timing corrections may arise due to the carrier aggregation being performed in different bands e.g. 700 MHz and 2.0 GHz and transmissions for one of the bands are routed via a repeater or relay node and for the other band they are not. In another example it may arise if transmissions for one of the bands are routed through a different antennae system to those of the other band and the antenna systems are located some distance apart (remote radio heads). The effect is that the path lengths between the eNB and the UE are different for the two bands and the path lengths can vary independently with changes in UE position. These are non-limiting examples only.

The LTE Release 10 UE 10 which supports independent timing alignment for two or more groups of uplink carriers will need to maintain the time alignment for each of the timing alignment groups in response to timing corrections received from the eNB 12, and it will need to detect when it has lost time alignment for the group and take the action needed to prevent itself from transmitting in the uplink when the UE 10 has lost timing alignment. The UE 10 will maintain a time alignment timer 10E for each group (one or more) of uplink component carriers assigned to the UE 10 that share a common timing advance, restarting the timer 10E when a timing correction for the group of channels is received in a MAC CE or RACH response. When a PDCCH order is received, the UE 10 also initiates the appropriate RACH procedure. And when a timing correction is received either in a MAC CE or a Random Access Response, the UE 10 identifies the group of uplink carriers (component carriers) to which it applies (which is the timing advance group) and pass the timing correction from the MAC layer to the physical layer for each of the carriers in the group.

For the case in which the time alignment timer 10E expires for a particular group, the UE implements the actions to be completed when timing alignment is lost for that group of uplink carriers. As noted above in the background section, in LTE Release 8 those actions were to clear all HARQ buffers, notify RRC to release PUCCH/SRS; and clear any configured downlink assignments and uplink grants. But LTE Release 8 does not use CA and so there is no case in which the UE can have its timer expire for one timing advance group but not another.

In the development of LTE Release 10, the configured set of CCs for a UE is always to consist of one DL primary CC (PCC), one UL PCC, and zero, one or more secondary CCs (SCCs) [further details in this regard may be seen at document R2-101846 entitled "Stage 2 Description of Carrier Aggregation" 3GPP TSG-RAN WG2 Meeting #69, San Francisco, USA, 22-26 Feb. 2010]. Specifically, the PCCs (DL and UL) initially corresponds to the cell with which the UE establishes or re-establishes the RRC connection, and can then be changed with a handover procedure (specifically, via a security key change and RACH procedure). The UL PCC is used for transmission of L1 uplink control information. Unlike DL SCCs, the DL PCC cannot be de-activated. Re-establishment is triggered when the DL PCC experiences radio link failure, not when DL SCCs experience radio link failure. Non-access stratum information is taken from the cell corresponding to the DL PCC.

It is clear that a UE 10 would have only one PCC, so that if the UE 10 is operating with carriers that are arranged in two or more independent timing alignment groups, then the primary carrier timing alignment relates to only one of the timing groups. But simply extending the same procedures from LTE Release 8 for the timing advance group of LTE Release 10 for which the timer has expired is not seen to be the best option going forward, for reasons noted in the background section above.

Figure 5:
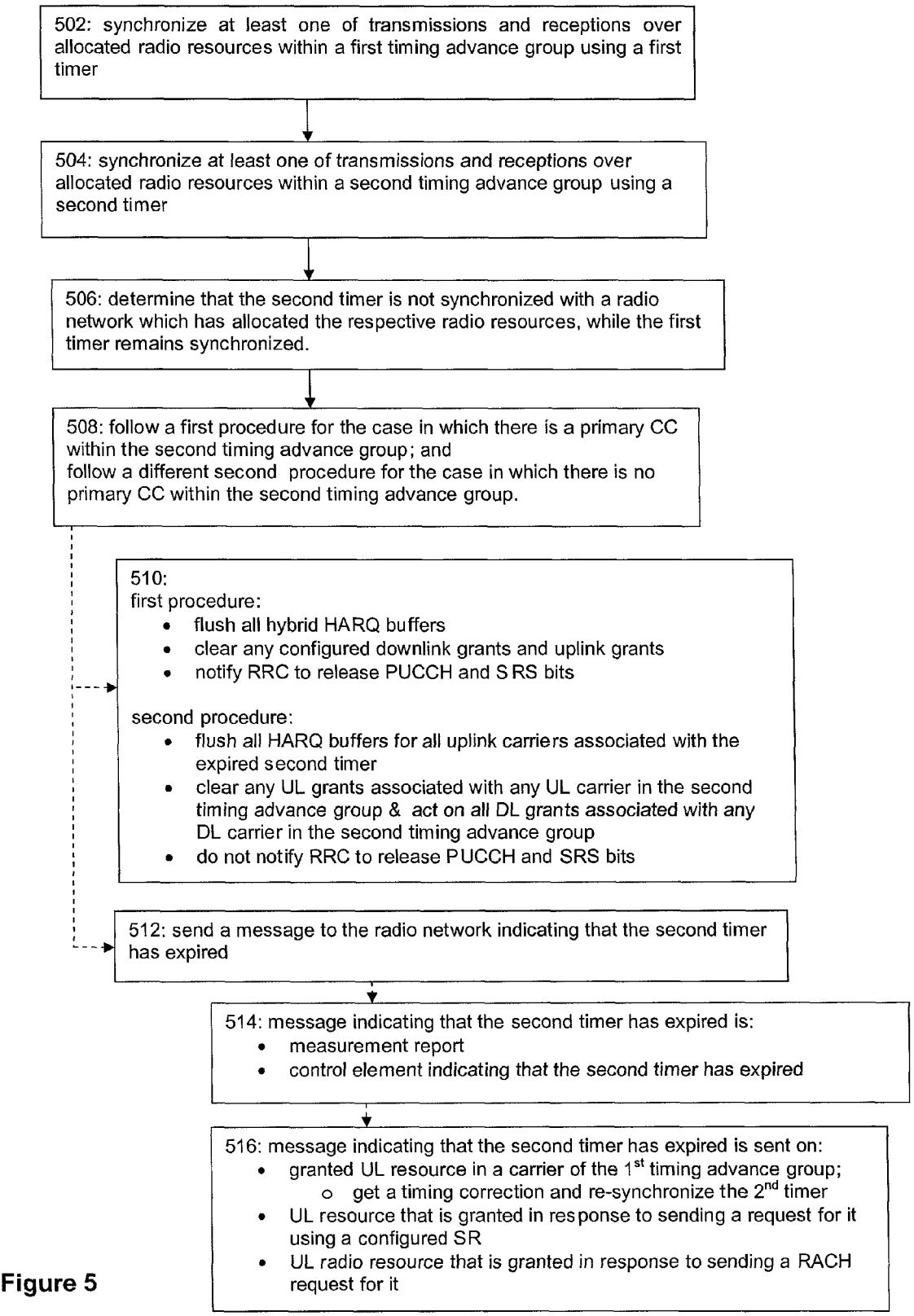
FIG. 5 is a logic flow diagram that illustrates the operation of a method, and a result of execution of computer program instructions embodied on a computer readable memory, in accordance with the exemplary embodiments of this invention.

Without loss of generality, an exemplary embodiment of the invention is shown in the flow diagram of FIG. 5. The UE which has two or more timing advance groups begins with an independent timer for each of those groups that is synchronized with the eNB. Using a first one of those timers, at block 502 the UE 10 synchronizes its UL transmissions and its DL receptions over allocated radio resources within a first timing advance group. Similarly, using a second one of those timers the UE 10 at block 504 synchronizes its UL transmissions and DL receptions over allocated radio resources within a second timing advance group. This same UE may or may not have additional timing advance groups with corresponding timers. The UE 10 determines at some point, shown as block 506, that the first timer remains synchronized while the second timer is not synchronized with the radio network which has allocated the respective radio resources.

In accordance with an exemplary embodiment of the invention there are different procedures which the UE 10 follows in response to the determining at block 506, depending upon whether the timing advance group for which synchronization is lost includes the primary component carrier PCC or if the PCC still has timing synchronization. Block 508 of FIG. 5 states this more specifically for the FIG. 5 example: the UE 10 follows a first procedure for the case in which there is a PCC in the second timing advance group, and follows a second procedure for the case in which there is no PCC in the second timing advance group. One reason behind this different treatment is that the primary carrier carries all uplink ACK/NACK reports in LTE Release 10, as well as CQI and SR (if SR is configured). Since the UE has only one PCC, loss of timing for the group carrying the PCC in LTE Release 10 means that no ACK/NACK reports or CQI reports can be sent for the SCC groups.

Block 510 of FIG. 5 outlines some of these different procedures according to a non-limiting example. If the second timing alignment timer which has expired is the one that is associated with the timing alignment group that does not include a primary carrier, then the UE follows a second procedure which includes:

flush all HARQ buffers for all uplink carriers associated with the expired second timing alignment timer;
clear the uplink grants, if any, associated with each of the uplink carriers that is associated with the expired second timing alignment timer;
not transmit on uplink channels associated with the expired second timing alignment timer except for RACH channels;
continue to receive PDCCH that carries commands for the second timing group associated with the expired second timing alignment timer, but ignoring all uplink grants until the second timing alignment timer is restarted. Downlink grants can be received and acted upon.
inform the eNB that timing alignment for the group of uplink carriers associated with the expired second time alignment timer has failed.

If the second timing alignment timer which has expired is the one that is associated with the timing alignment group that does include the primary carrier, then the UE follows a first procedure which in this example is the same as that for a LTE Release 8 UE that loses its timing synchronization. By example and as shown at block 510 the first procedure includes:

flush all HARQ buffers;
notify RRC to release PUCCH/SRS; and
clear any configured downlink assignments and uplink grants.

If the UE 10 has one or more additional timing advance groups of carriers for which the associated timing advance timer has not expired, such as the first timing advance group that is associated with the un-expired first timer in the FIG. 5 example, then with regard to carriers in these groups the UE can:

continue to receive PDCCH and uplink and downlink grants for these carriers; and
use uplink grants but not downlink grants, because the carrier for sending HARQ ACK/NACK reports (the PCC) is not in time alignment.

In an exemplary embodiment and further in response to the determination at block 506, the UE 10 at block 512 sends a message to the radio network indicating that the second timer has expired. Block 514 of FIG. 5 briefly summarizes two different formats that synchronization-failure message of block 512 may take. In all cases the message identifies that it is the second timer, associated with the second timing advance group, which has failed. This identification may be explicit or implicit in how the failure message is indicted, and it may identify the timer or the group; either one identifies the other since each timer is associated with one and only one timer advance group at any given time for any given eNB 12.

In one exemplary embodiment for the timing expiration message, the MAC layer of the UE 10 informs the RRC of the UE that the second timing alignment timer has expired. The RRC of the UE 10 then informs the eNB 12 using an RRC message. The RRC message used may be a Measurement Report as noted at block 514. Alternatively the message informing the eNB of timing synchronization failure is a new RRC signaling message introduced for the purpose of indicating timing alignment failure or a more general message designed to report more than one failure condition (for example, downlink synchronization failure for an individual downlink carrier). At this point the eNB 12 can decide whether to bring the timing group back into alignment by transmitting a PDCCH order on the corresponding PDCCH channel, or do nothing and allow the second timer to remain un-synchronized.

If a measurement report is used to single that the second timer is expired, in an embodiment there is a new measurement event that is introduced, the event trigger for this new measurement event is loss of uplink timing alignment. In one embodiment the UE 10 is configured to monitor for this new event trigger. In this case which the measurement event trigger is configured, the UE 10 would report the timing alignment failure if the UE determines that the second timer has expired. In another embodiment the UE 10 is not configured to monitor for the new event trigger, and so if one of the timers expires the UE would not send the timing expiration message.

In another exemplary embodiment for the timing expiration message, the MAC layer of the UE transmits a MAC control element CE that indicates to the peer MAC layer of the eNB 12 that the second timer has expired. The eNB 12 can then respond as described above for the case in which the timing expiration message is a measurement report: transmit a PDCCH order on the corresponding PDCCH channel, or do nothing.

Regardless of the specific form of the timing expiration message shown by example at block 514, block 516 summarized different manners in which that message can be sent. By non-limiting example only these are conditional and the UE 10 sends the message indicating that the second timer has expired by the first one of the series in block 516 that applies. If the UE has an uplink grant for a timing group for which it has timing alignment (for example, for the first group in the FIG. 5 example), the UE 10 can use this uplink grant to transfer the RRC message or the MAC CE.

Further at block 516 if instead the UE has no uplink grant on any other UL carrier in a group whose timer has not expired, then if the UE 10 has SR configured, it can use the SR to request an uplink grant. By example this request can be according to existing LTE Release 8 principles.

Still further at block 516 for the case in which the UE 10 has no uplink grant and no SR configured, then it can use the RACH to obtain an uplink grant. Again in an example this RACH process can be according to existing LTE Release 8 principles. If the UE 10 has RACH resources available for an UL carrier that is part of the second timing group for which the UE 10 has lost timing alignment then the UE 10 should preferably use this RACH in order that it can obtain a timing correction for the expired second timing advance group. If that preferred RACH is not available the UE 10 can use a RACH on a different timing group for which the timer has not expired.

For the case in which the form of the message reporting expiration of the second timer is a MAC layer CE as at block 514, this CE can replace the BSR that would be included under LTE Release 8 rules. This operates to reduce the number of grants needed to complete the information exchange. In both cases transmission of the message of block 512 is initiated only once.

The UE 10 can also report the expiry of the second timer that is associated with the timing advance group which includes the PCC according to the options shown at block 514; either an RRC/measurement report or a MAC layer CE that is reported to the eNB 12 if the UE 10 has an uplink grant available per block 516.

By the above exemplary embodiments, for the case in which the UE does not have an additional timing advance group available, then it must be that there is no un-expired timing advance timer. This means that the PCC is in a group with an expired timer, and the end result following the above first procedure with no remaining synchronized timing advance group is that the UE 10 behaves just as a LTE Release 8 UE whose timing advance timer has expired.

One specific technical effect of the above exemplary embodiments is that there is a much improved possibility to avoid triggering a radio link failure when a timing advance group timer expires.

FIG. 5 may be considered to be a logic flow diagram that illustrates the operation of a method, and a result of execution of computer program instructions, in accordance with the exemplary embodiments of this invention, such as for example from the perspective of the UE. Dashed lines at FIG. 5 indicate optional elements. The various blocks shown in FIG. 5 may be viewed as method steps, and/or as operations that result from operation of computer program code, and/or as a plurality of coupled logic circuit elements constructed to carry out the associated function(s).

For example, the UE and eNB, or one or more components thereof, can form an apparatus comprising at least one processor and at least one memory including computer program code, in which the at least one memory and the computer program code are configured to, with the at least one processor, cause the apparatus to perform the elements shown at FIG. 5 and/or recited in further detail above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and channels (for example, PDCCH) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   synchronizing at a user equipment at least one of transmissions and receptions over allocated radio resources within a first timing advance group using a first timer;
   synchronizing at the user equipment at least one of transmissions and receptions over allocated radio resources within a second timing advance group using a second timer; and
   in response to determining that the first timer is not expired while the second timer has expired with a radio network which has allocated the respective radio resources, following by the user equipment a first procedure for a case in which there is a primary component carrier within the second timing advance group and following a different second procedure for a case in which there is no primary component carrier within the second timing advance group, wherein the first procedure comprises flushing all hybrid automatic repeat request buffers and wherein the second procedure comprises flushing all hybrid automatic repeat request buffers for all uplink carriers associated with the expired second timer;
   wherein the first timer is a timing alignment timer associated with the first timing advance group and the second timer is a timing alignment timer associated with the second timing advance group.

2. The method according to claim 1, in which:
   the second procedure further comprises:
   clearing any uplink grants associated with any uplink carrier in the second timing advance group; and
   acting upon all downlink grants associated with any downlink carrier in the second timing advance group.

3. The method according to claim 1, in which the second procedure does not comprise notifying radio resource control to release a physical uplink control channel and sounding reference signal bits.

4. The method according to claim 1, in which:
   the first procedure further comprises clearing any configured downlink grants and uplink grants.

5. The method according to claim 1, in which:
   the first procedure comprises notifying radio resource control to release a physical uplink control channel and sounding reference signal bits.

6. The method according to claim 1, further comprising:
   sending a message to the radio network indicating that the second timer has expired.

7. The method according to claim 6, in which the message indicating that the second timer has expired comprises a measurement report which is triggered to be sent by the expiration of the second timer.

8. The method according to claim 6, in which the message indicating that the second timer has expired comprises a control element indicating that the second timer has expired.

9. The method according to claim 6, in which the message indicating that the second timer has expired is sent on a granted uplink radio resource within a carrier of the first timing advance group.

10. A memory storing a program of computer readable instructions that when executed by a processor result in actions comprising:
    synchronizing at a user equipment at least one of transmissions and receptions over allocated radio resources within a first timing advance group using a first timer;
    synchronizing at the user equipment at least one of transmissions and receptions over allocated radio resources within a second timing advance group using a second timer; and
    in response to determining that the first timer is not expired while the second timer has expired with a radio network which has allocated the respective radio resources, following by the user equipment a first procedure for a case in which there is a primary component carrier within the second timing advance group and following a different second procedure for a case in which there is no primary component carrier within the second timing advance group, wherein the first procedure comprises flushing all hybrid automatic repeat request buffers and wherein the second procedure comprises flushing all hybrid automatic repeat request buffers for all uplink carriers associated with the expired second timer;
    wherein the first timer is a timing alignment timer associated with the first timing advance group and the second timer is a timing alignment timer associated with the second timing advance group.

11. An apparatus comprising:
    at least one processor;
    at least one memory including computer program code;
    the at least one memory and the computer program code configured to, with the at least one processor, cause the apparatus at least to:
    synchronize at the user equipment at least one of transmissions and receptions over allocated radio resources within a first timing advance group using a first timer;
    synchronize at the user equipment at least one of transmissions and receptions over allocated radio resources within a second timing advance group using a second timer; and
    in response to determining that the first timer is not expired while the second timer has expired with a radio network which has allocated the respective radio resources, follow by the user equipment a first procedure for a case in which there is a primary component carrier within the second timing advance group and follow a different second procedure for a case in which there is no primary component carrier within the second timing advance group, wherein the first procedure comprises flushing all hybrid automatic repeat request buffers and wherein the second procedure comprises flushing all hybrid automatic repeat request buffers for all uplink carriers associated with the expired second timer;
    wherein the first timer is a timing alignment timer associated with the first timing advance group and the second timer is a timing alignment timer associated with the second timing advance group.

12. The apparatus according to claim 11, in which:
    the second procedure further comprises:
    clearing any uplink grants associated with any uplink carrier in the second timing advance group; and
    acting upon all downlink grants associated with any downlink carrier in the second timing advance group.

13. The apparatus according to claim 11, in which the second procedure does not comprise notifying radio resource control to release a physical uplink control channel and sounding reference signal bits.

14. The apparatus according to claim 11, in which:
    the first procedure further comprises clearing any configured downlink grants and uplink grants.

15. The apparatus according to claim 11, in which:
the first procedure comprises notifying radio resource control to release a physical uplink control channel and sounding reference signal bits.

16. The apparatus according to claim 11, in which the at least one memory and the computer program code are configured with the at least one processor to further cause the apparatus, in response to the determining, to send a message to the radio network indicating that the second timer has expired.

17. The apparatus according to claim 16, in which the message indicating that the second timer has expired comprises a measurement report which is triggered to be sent by the expiration of the second timer.

18. The apparatus according to claim 16, in which the message indicating that the second timer has expired comprises a control element indicating that the second timer has expired.

19. The apparatus according to claim 16, in which the message indicating that the second timer has expired is sent on a granted uplink radio resource within a carrier of the first timing advance group.

20. The apparatus according to claim 19, in which the at least one memory and the computer program code are configured with the at least one processor to further cause the apparatus to re-synchronize the second timer after the second timer expires using a timing correction obtained on a carrier of the first timing advance group.

21. The apparatus according to claim 16, in which the message indicating that the second timer has expired is sent on an uplink radio resource that is granted in response to sending a request for the uplink radio resource using a configured scheduling request,
for the case which, at the time the second timer expires, there is no granted uplink radio resource within a carrier of the first timing advance group but there is a scheduling request configured.

22. The apparatus according to claim 16, in which the message indicating that the second timer has expired is sent on an uplink radio resource that is granted in response to sending a random access request,
for the case in which, at the time the second timer expires, there is no granted uplink radio resource within a carrier of the first timing advance group and there is no scheduling request configured.

23. A method comprising:
allocating at a base station one or more radio resources within a first timing advance group using a first timer and allocating one or more radio resource within a second timing advance group using a second timer; and
receiving at the base station a random access transmission on a random access channel in response to determining by the user equipment that (a) the second timer has expired and (b) a primary component carrier exists within the second timing advance group;
wherein the first timer is a timing alignment timer associated with the first timing advance group and the second timer is a timing alignment timer associated with the second timing advance group, and a first procedure for a case in which the primary component carrier exists within the second timing advance group and a different second procedure for a case in which there is no primary component carrier within the second timing advance group are followed by the user equipment in response to determining that the first timer is not expired while the second timer has expired with a radio network which has allocated the respective radio resource, wherein the first procedure comprises flushing all hybrid automatic repeat request buffers and wherein the second procedure comprises flushing all hybrid automatic repeat request buffers for all uplink carriers associated with the expired second timer.

24. The method of claim 23 wherein the random access transmission is received on another random access channel from a timing advance group different from a timing advance group for which the second timer has expired.

25. An apparatus comprising:
at least one processor;
at least one memory including computer program code;
the at least one memory and the computer program code configured to, with the at least one processor, cause the apparatus at least to:
allocate at the base station one or more radio resources within a first timing advance group using a first timer and allocating one or more radio resource within a second timing advance group using a second timer; and
receive at the base station a random access transmission on a random access channel in response to determining by the user equipment that (a) the second timer has expired and (b) a primary component carrier exists within the second timing advance group;
wherein the first timer is a timing alignment timer associated with the first timing advance group and the second timer is a timing alignment timer associated with the second timing advance group, and a first procedure for a case in which the primary component carrier exists within the second timing advance group and a different second procedure for a case in which there is no primary component carrier within the second timing advance group are followed by the user equipment in response to determining that the first timer is not expired while the second timer has expired with a radio network which has allocated the respective radio resource, wherein the first procedure comprises flushing all hybrid automatic repeat request buffers and wherein the second procedure comprises flushing all hybrid automatic repeat request buffers for all uplink carriers associated with the expired second timer.

26. The apparatus of claim 25 wherein the random access transmission is received on another random access channel from a timing advance group different from a timing advance group for which the second timer has expired.

* * * * *